3,732,187
CARBODIIMIDE FOAMS OF REDUCED BRITTLE-
NESS PREPARED FROM RESOLE-DERIVED
QUASI-PREPOLYMERS
Moses Cenker, Trenton, and Peter T. Kan, Plymouth, Mich., assignors to BASF Wyandotte Corporation, Wyandotte, Mich.
No Drawing. Filed Dec. 6, 1971, Ser. No. 205,393
Int. Cl. C08g 22/48
U.S. Cl. 260—77.5 BF    5 Claims

ABSTRACT OF THE DISCLOSURE

Rigid foams characterized by carbodiimide linkages of reduced brittleness and improved strength and heat resistance are prepared by the catalytic condensation of an NCO-terminated resole-derived quasi-prepolymer, optionally, in admixture with other organic polyisocyanates.

BACKGROUND OF THE INVENTION

(1) Field of the invention

The present invention concerns rigid foams characterized by carbodiimide linkages. More particularly the present invention concerns rigid foams characterized by carbodiimide linkages of reduced brittleness and improved strength and heat resistance and which are prepared by the catalytic condensation of an NCO-terminated resole-derived quasi-prepolymer.

(2) Prior art

The preparation of rigid foams characterized by carbodiimide linkages (hereinafter referred to as carbodiimide foams) has heretofore been described. See, inter alia, copending U.S. patent application Ser. Nos. 5,985, filed Jan. 26, 1970, now U.S. Pat. No. 3,645,923; 157,025, filed June 25, 1971; 118,994, filed Feb. 25, 1971; 169,470, filed Aug. 5, 1971; 169,526, filed Aug. 5, 1971; and 185,910, filed Oct. 1, 1971, the disclosures of which are hereby incorporated by reference.

Generally, these applications disclose the preparation of the within-considered foams by the catalytic condensation of an organic polyisocyanate. More specifically, these applications teach the use of 2,4,6-tris(dialkanol-amino)-s-triazine or 2,4,6-tris(N-methylethanolamino)-s-triazine as primary catalysts for the reaction as well as the use of known isocyanate trimerization catalysts in conjoint use with the primary catalyst.

Further, these applications teach the use of auxiliary blowing agents, acrylonitrile-graft polyols, and other ingredients in the preparation of the foams.

The rigid foams as taught by these applications are generally prepared by initiation of reaction at a temperature ranging from about room temperature to about 100° C.

The present invention seeks to improve upon the above-described foams by providing means and method for reducing the brittleness of the foams while improving the strength and heat resistance thereof.

SUMMARY OF THE INVENTION

In accordance with the present invention, carbodiimide foams of improved strength and heat resistance are prepared by the catalytic condensation of an NCO-terminated resole-derived quasi-prepolymer. Optionally, other organic polyisocyanates can be employed in admixture with the quasi-prepolymer.

For a more complete understanding of the present invention, reference is made to the following detailed description and examples thereof.

DESCRIPTION OF THE PREFERRED EMBODIMENTS

Resole-derived quasi-prepolymers having terminal isocyanate groups have unexpectedly been found to be useful in the preparation of carbodiimide rigid foams. Although resoles, per se, have heretofore been used in foam applications, the use of NCO-terminated resole-derived quasi-prepolymers as the polyisocyanate reactant for the preparation of carbodiimide rigid foams has not heretofore been exploited or reported.

"Resoles" as defined herein is intended to mean methylol substituted phenols prepared by the reaction of formaldehyde and a phenol. Usually they are prepared by reacting a molar excess ranging from about 1.5:1 to 5:1, preferably 1.8:1 to 3:1 of formaldehyde in the presence of a base catalyst, generally at a pH of 8 or above, at a temperature ranging from about room temperature to 100° C. and at atmospheric pressures.

The phenols generally employed to prepare the resoles are either phenol, or mono alkyl-substituted phenols, such as, t-butylphenol, cresol, m-substituted phenols containing inert substituents in the meta position, and the like, and, preferably, phenol.

Although formaldehyde is most commonly employed, it is possible, though not practical or preferred, to use other aldehydes, such as, acetaldehyde and the like.

Typical of the resole contemplated herein is the one produced by reacting one mole of phenol and two moles of formaldehyde under slightly basic conditions, e.g. a pH of 8, to form methylol-substituted phenols, including the mono-, di- and trimethylol phenols. It is to be understood that along with the formation of the substituted phenols, polymerization thereof into higher molecular weight complex compounds containing methylene bridges, ether linkages and the like, also, occurs under basic conditions. These reactions are more comprehensively considered by Carswell, Phenolplasts, Interscience Publishers, New York, N.Y., 1947. See also Canadian Pat. No. 846,877.

Further, it is essential hereto, for reasons which are further detailed below, that the resole be substantially anhydrous.

The resoles are employed herein for the preparation of a so-called NCO-terminated, "quasi-prepolymer," i.e. a compound prepared by reacting a stoichiometric excess of organic polyisocyanate with an active-hydrogen containing compound. It is apparent heretofrom that if water were present in the resole then less desirable urea linkages would be formed with the consumption of isocyanate.

The quasi-prepolymer is prepared, as noted, by the reaction of greater than stoichiometric requirements of organic polyisocyanate with the active-hydrogen containing compound, the resole using reaction parameters well known to those skilled in the art. Generally speaking, the reaction proceeds at atmospheric pressure at a temperature ranging from about 25 to 200° C. for a period of time ranging from about 10 to 300 minutes. Preferably, the reaction proceeds at a temperature ranging from about 50 to 100° C. for a period of time ranging from about 30 to 60 minutes. It is to be understood that these designated parameters are provided solely as general guidelines, the actual parameters that any skilled artisan will employ in practicing the present invention will be determined by the desired viscosity and isocyanate content of the resulting quasi-prepolymers, these latter values being empirically determined. Generally, though the free isocyanate content of the quasi-prepolymer will range from about 20 to 40%; if higher, the prepolymer will too closely behave like the polyisocyanate; if below about 20% it will too closely resemble an actual prepolymer.

The organic polyisocyanates which are used to prepare the quasi-prepolymer can be represented by the formula:

$$R(NCO)_z$$

wherein R is a polyvalent organic radical selected from the group of aliphatic, aromatic, arylalkyl and alkylaryl organic radicals as well as mixtures thereof; and z is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethylene triisocyanate, 2,4,6-toluene triisocyanates; the aromatic tetraisocyanates, such as 4,4'-dimethyldiphenylmethane-2,2'-5,5' - tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, diphenylmethane - 4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use in making the resole-derived quasi-prepolymer are other "quasi-prepolymers." These quasi-prepolymers are prepared by reacting an excess of organic polyisocyanate or mixtures thereof with a minor amount of an active hydrogen containing compound as determined by the well-known Zerewitinoff test, as described by Kohler in J. Am. Chem. Soc., 49, 3181 (1927). These compounds and their methods of preparation are well known in the art. The use of any one specific active hydrogen compound is not critical hereto, rather, any such compound that can be used to prepare a quasi-prepolymer can be employed herein. Generally speaking, the quasi-prepolymers are prepared by reacting an organic polyisocyanate with less than a stoichiometric amount, based on the weight of the polyisocyanate, of the active hydrogen containing compound.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-containing polyesters, polyalkylene ether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic, and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds amy be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-(4,4'-hydroxyphenol)propane, commonly known as Bisphenol A.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257-262, published by Interscience Publishers, Inc. (1951) or in U.S. Pat. No. 1,922,459.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkane thiols such as 2-butene-1,4-dithiol; and alkyne thiols such as 3-hexyne-1,6-dithiol.

Any suitable polyamine may be used including aromatic polyamines such as p-aminoaniline, 1,5-diaminonaphthalene, and 2,4-diaminotoluene, aliphatic polyamines such as, ethylenediamine, 1,3-propylenediamine, 1,4-butylenediamine, and 1,3-butylenediamine, as well as substituted secondary derivatives thereof.

Other compounds which do not necessarily fit within any of the previously set forth classes of compounds which are quite suitable in the production of the quasi-prepolymers include the hydroxy-terminated polyurethane polymers such as hydroxy-terminated polymer made by reacting an isocyanate with several moles of an alkylene glycol.

In the practice of the present invention, the preferred organic polyisocyanate for preparing the quasi-prepolymer is either crude toluene diisocyanate, toluene diisocyanate, methylene diphenyldiisocyanate, crude methylene diphenyldiisocyanate, or mixtures thereof.

The resulting quasi-prepolymers will range from highly mobile liquids to extremely viscous fluids, all such being amenable to the present invention, and will generally contain from about 5 to 10% of urethane linkages.

In accordance with the present invention, rigid foams characterized by carbodiimide linkages are prepared from the above-defined resole-derived quasi-prepolymer. The foams produced therefrom exhibit improved strength, improved heat resistance and reduction in brittleness.

It will be apparent to those skilled in the art that the present invention affords a means whereby minor amounts of urethane groups can be introduced into the carbodiimide foams which heretofore contained solely carbodiimide linkages, free isocyanate and some isocyanurate groups. More importantly the present invention provides means whereby the advantages of urethane groups, e.g. compressive strength and reduced brittleness, can be incorporated into carbodiimide foams without deleteriously affecting the phenomena associated with such foams, e.g. excellent flame resistance and weight retention and usually low smoke evolution.

The carbodiimide foams of the present invention are prepared in substantially the same manner as described in the above-referred to copending patent applications by condensing the quasi-prepolymer in the presence of any one of the above-described catalyst systems at a temperature of from about room temperature to about 100° C. The catalyst system will, generally, be employed in an amount ranging from about one to ten parts by weight thereof per one hundred parts by weight of isocyanate reactant.

The preferred catalyst system consists essentially of a mixture of (a) 2,4,6-tris(N-methylethanolamino)-s-triazine and (b) 1,3,5-tris(N,N-dimethyl-3-aminopropyl)-s-hexahydrotriazine, a catalytic system more specifically disclosed in the above-cited copending Ser. No. 169,526.

It is to be further understood that the present resole-derived quasi-prepolymer can comprise either the sole isocyanate component for the carbodiimide foam or, optionally, can be used in admixture with other organic polyisocyanate. Any of the hereinbefore defined organic polyisocyanates used to prepare the quasi-prepolymer can, by itself, serve as the other organic polyisocyanate to be used conjointly with the quasi-prepolymer.

In order to realize the benefits of the present invention when utilizing a mixture of resole-derived quasi-prepolymers and other organic polyisocyanates, generally they should be employed in a respective weight ratio of from about 99:1 to 50:50. Preferably, a weight ratio of quasi-prepolymer to other polyisocyanates of from about 90:10 to 70:30 is used.

Also, in preparing carbodiimide foams from the resole-derived quasi-prepolymers, additional ingredients, such as, active hydrogen-containing compounds, plasticizers, surfactants, blowing agents and the like can be utilized to further enhance and tailor the physical properties of the resulting carbodiimide foams.

To illustrate the embodiments of the invention, above-defined, following are specific, non-limiting examples of these embodiments. In the examples, all indicated parts are by weight, absent contrary notation. Further, in preparing carbodiimide foams from the present resole-derived quasi-prepolymers, the following constants were employed:

(1) the halohydrocarbon blowing agent, where used, was dissolved in the quasi-prepolymer prior to the introduction of the catalyst into the system, in a manner as described in copending application, Ser. No. 169,526, filed Aug. 5, 1971;
(2) the catalyst system employed was a 2:1 weight ratio mixture of 2,4,6 - tris(N - methylethanolamino)-s-triazine and 1,3,5-tris(N,N-dimethyl-3-aminopropyl)-s-hexahydrotriazine;
(3) plasticizers and surfactants, where used, were pre-blended with the catalyst system, prior to its introduction to the quasi-prepolymer, to facilitate their use and handling; and
(4) the other polyisocyanate, when used in admixture with the quasi-prepolymer, was an 80:20 weight mixture of 2,4- and 2,6-toluene diisocyanate.

EXAMPLE I

This example illustrates the preparation of a resole as contemplated by the present invention.

To a suitable reaction vessel equipped with stirring means, heating means, evacuation means, and which was operatively connected to a pH meter and maintained under a nitrogen atmosphere was added 900 parts (9.56 moles) of phenol in 126 parts of water and 1557 parts of 37% aqueous formaldehyde (576 parts formaldehyde or 19.2 moles). The phenol and formaldehyde were stirred at room temperature until a homogeneous mix was obtained. Then, 52 mls. of an aqueous sodium hydroxide solution prepared by dissolving 18 parts of sodium hydroxide in 126 parts of water was slowly added, with stirring, to the phenol-formaldehyde mixture in the vessel until the pH reached 8. The resulting solution was then, with stirring, heated to about 85° C. and was maintained thereat for about 1.25 hours to insure complete reaction.

A clear yellow solution was obtained which was then cooled down to about 30° C. and to it was slowly added 40 mls. of 10% sulfuric acid to bring the solution to pH 5.

The evacuation means was then activated and 1100 parts of water were stripped out at 40° C. and 60 mm. Hg. The warm, cloudy material was then filtered to remove sodium sulfate and the recovered filtrate was then stripped at 40° C. at 4 mm. Hg to a constant weight.

A yield of 1325 parts of substantially anhydrous resole was, thus, obtained. The resole had a viscosity of 12,000 cps. at 27° C. and a hydroxyl number of 1100.

EXAMPLE II

This example illustrates the preparation of resole-derived quasi-prepolymers.

Using the resole of Example I a series of NCO-terminated resole-derived quasi-prepolymers were prepared by the following procedure:

To a suitable reaction vessel equipped with heating means and stirring means was added an organic polyisocyanate which was maintained in the vessel at a temperature of about 70° C. With stirring the resole, previously heated and maintained at about 60° C., was slowly added to the polyisocyanate over a 15 to 30 minute period. After the addition was completed the mixture was then, with stirring, heated up to about 80° to 85° C. and was maintained thereat for about 30 minutes. The product was then cooled down to room temperature and was ready for use.

By this procedure the following quasi-prepolymers were prepared:

Prepolymer A—prepared from 10 parts of crude methylene diphenyldiisocyanate and 0.5 part of resole. The quasi-prepolymer had a viscosity of 1600 cps. at 27° C. and a free-NCO content of 29.1%.

Prepolymer B—prepared from 10 parts crude methylene diphenyldiisocyanate and 1.0 part of resole. The quasi-prepolymer had a viscosity of 112,000 cps. at 27° C. and a free-NCO content of 25.4%.

Prepolymer C—prepared from 1 part of an 80:20 weight mixture of 2,4- and 2,6-toluene diisocyanate, 9 parts crude methylene diphenyldiisocyanate and 0.5 part resole. The prepolymer had a viscosity of 800 cps. at 27° C. and a free-NCO content of 30%.

Prepolymer D—prepared from 1 part of an 80:20 weight mixture of 2,4- and 2,6-toluene diisocyanate, 9 parts crude methylene diphenyldiisocyanate and 1.0 part resole. The quasi-prepolymer had a viscosity of 9200 cps. at 27° C. and a free-NCO content of 27.5%.

Prepolymer E—prepared from 2.0 parts of an 80:20 weight mixture of 2,4- and 2,6-toluene diisocyanate, 8 parts of crude methylene diphenyldiisocyanate and 0.5 part of resole. The quasi-prepolymer had a viscosity of 500 cps. at 27° C. and a free-NCO content of 32.2%.

Prepolymer F—prepared from 2.0 parts of 80:20 weight mixture of 2,4- and 2,6-toluene diisocyanate, 8.0 parts of crude methylene diphenyldiisocyanate and 1.0 part of resole. The quasi-prepolymer had a viscosity of 1600 cps. at 27° C. and a free-NCO content of 30.4%.

EXAMPLE III

This example illustrates the preparation of rigid foams characterized by carbodiimide linkages from the resole-derived quasi-prepolymers of Example II and in accordance with the present invention.

At room temperature and at atmospheric pressure into a suitable reaction vessel was added the resole-derived quasi-prepolymer and other organic polyisocyanate, where used, the halohydrocarbon blowing agent, where used, being dissolved therein. Then, with stirring, the catalyst system containing the plasticizer and surfactant was added thereto. After a few seconds an exotherm was generated within the vessel followed shortly thereafter by the beginning of foam formation.

The resulting foams were rigid in nature, containing in addition to the carbodiimide linkages, free isocyanate, isocyanurate and minor amounts of urethane.

The following table, Table I, sets forth the ingredients and amounts thereof used to prepare the foams as well as some of the physical properties of the resulting foams.

TABLE I

| Foam sample | Quasi-prepoly. Type | Quasi-prepoly. Amt. | Add'l polyiso. | Halo-hydrocarbon [1] | Catalyst system | Plasticizer [2] | Surfactant [3] | Density, p.c.f. | Closed cell content, percent |
|---|---|---|---|---|---|---|---|---|---|
| 1 | B | 80 | 20 | 15 | 2.7 | 1.20 | 0.60 | 2.53 | 98 |
| 2 | B | 90 | 10 | 15 | 2.7 | 1.20 | 0.60 | 2.68 | 98 |
| 3 | A | 80 | 20 | 15 | 2.7 | 1.20 | 0.60 | 3.20 | 98 |
| 4 | A | 90 | 10 | 15 | 3.0 | 1.33 | 0.67 | 3.07 | 98 |
| 5 | A | 100 | | 15 | 3.3 | 1.46 | 0.74 | 3.77 | 98 |
| 6 | C | 100 | | 15 | 2.7 | 1.20 | 0.60 | 2.87 | 98 |
| 7 | C | 100 | | 15 | 3.0 | 1.33 | 0.67 | 2.97 | 98 |
| 8 | C | 100 | | 15 | 3.3 | 1.46 | 0.74 | 3.11 | 97 |
| 9 | E | 100 | | 15 | 2.4 | 1.06 | 0.54 | 3.29 | 96 |
| 10 | E | 100 | | 15 | 2.7 | 1.20 | 0.60 | 3.28 | 97 |
| 11 | E | 100 | | 15 | 3.0 | 1.33 | 0.67 | 3.28 | 97 |
| 12 | A | 70 | 30 | 10 | 3.0 | 1.33 | 0.67 | 2.97 | 98 |
| 13 | B | 70 | 30 | 10 | 3.0 | 1.33 | 0.67 | 2.10 | 97 |
| 14 | B | 70 | 30 | 10 | 3.6 | 1.60 | 0.80 | 2.18 | 98 |
| 15 | D | 70 | 30 | 10 | 2.4 | 1.06 | 0.54 | 1.85 | 98 |
| 16 | D | 80 | 20 | 10 | 2.4 | 1.06 | 0.54 | 2.02 | 97 |
| 17 | D | 90 | 10 | 10 | 3.0 | 1.33 | 0.67 | 2.17 | 98 |
| 18 | D | 100 | | 10 | 3.6 | 1.60 | 0.80 | 2.31 | 99 |
| 19 | E | 100 | | 10 | 3.0 | 1.33 | 0.67 | 2.29 | 98 |
| 20 | F | 100 | | 10 | 3.0 | 1.33 | 0.67 | 2.35 | 90 |
| 21 [4] | F | 100 | | | 3.0 | 1.33 | 0.67 | 5.45 | 42 |
| 22 [5] | F | 100 | | | 3.0 | 1.33 | 0.67 | 5.31 | 19 |

[1] Foams 1-11 made with 1,1,2-trifluoro-1,2,2-trichloroethane blowing agent. Foams 12-20 made with trichlorofluoromethane blowing agent.
[2] Tris(2-chloroethyl)phosphate.
[3] A polymethylsiloxane sold by Dow Corning under the name DC-193.
[4] Initiated at 40° C. and without auxiliary blowing agent.
[5] Initiated at 60° C. and without auxiliary blowing agent.

EXAMPLE IV

Each of the foams of Example III were tested for strength in accordance with ASTM D1621, standard method of test for the compressive strength of rigid cellular plastics, to measure the compressive strength at 10% deflection. The results of these tests were as follows:

| Foam sample: | Compressive strength, 10% deflection, p.s.i. |
|---|---|
| 1 | 37 |
| 2 | 44 |
| 3 | 64 |
| 4 | 63 |
| 5 | 77 |
| 6 | 58 |
| 7 | 68 |
| 8 | 60 |
| 9 | 62 |
| 10 | 74 |
| 11 | 57 |
| 12 | 35 |
| 13 | 33 |
| 14 | 36 |
| 15 | 26 |
| 16 | 34 |
| 17 | 34 |
| 18 | 38 |
| 19 | 36 |
| 20 | 33 |
| 21 | 101 |
| 22 | 51 |

This is compared to other carbodiimide foams prepared without the resole-derived quasi-prepolymer which generally exhibit a compressive strength at 10% deflection usually of about 20–30 p.s.i. for foams of about 2–3 p.c.f. density.

EXAMPLE V

Each of the foam samples of Example III were tested for flame properties in accordance with the Butler Chimney Test as described by Krueger et al., SPE 25th Antec., V. XIII, Detroit, Mich., 1967, p. 1052–1057. The results of these tests are set forth below in Table II.

TABLE II.—BUTLER CHIMNEY TEST

| Foam sample | Percent weight retention | Flame height [1] | Smoke |
|---|---|---|---|
| 1 | 94 | C− | Heavy. |
| 2 | 95 | C− | Do. |
| 3 | 97 | C− | Do. |
| 4 | 97 | B | Do. |
| 5 | 97 | B | Do. |
| 6 | 97 | B | Do. |
| 7 | 96 | C− | Do. |
| 8 | 97 | C− | Do. |
| 9 | 97 | C− | Do. |
| 10 | 97 | B | Do. |
| 11 | 96 | C− | Do. |
| 12 | 96 | B | Light. |
| 13 | 95 | C− | Heavy. |
| 14 | 94 | C− | Do. |
| 15 | 96 | B | Medium. |
| 16 | 97 | B | Light. |
| 17 | 96 | B | Do. |
| 18 | 96 | B | Medium. |
| 19 | 96 | C− | Do. |
| 20 | 94 | C+ | Heavy. |
| 21 | 98 | C− | Do. |
| 22 | 98 | C− | Medium. |

[1] Flame height code: A=0–2″ flame height, B=2–5″ flame height, C−=5–7″ flame height, C+=7–10″ flame height, D=10″ and above flame height.

Having thus described the invention, what it is desired to claim and secure by Letters Patent is:

1. A rigid foam characterized by carbodiimide linkages prepared by the catalytic condensation of an NCO-terminated resole-derived quasi-prepolymer said prepolymer being the reaction product of a resole and a stoichiometric excess of an organic polyisocyanate.

2. The foam of claim 1 wherein the organic polyisocyanate is selected from the group consisting of crude toluene diisocyanate, toluene diisocyanate, crude methylene diphenyldiisocyanate, methylene diphenydiisocyanate and mixtures thereof.

3. The foam of claim 1 wherein the resole is prepared by the reaction of phenol and formaldehyde under base conditions and in a respective molar ratio of from about 1:1.5 to about 1:5.0.

4. The foam of claim 1 wherein the resole-derived quasi-prepolymer is employed in admixture with an organic polyisocyanate.

5. The foam of claim 4 wherein the organic polyisocyanate is selected from the group consisting of crude toluene diisocyanate, toluene diisocyanate, crude methylene diphenyldiisocyanate, methylene diphenyldiisocyanate and mixtures thereof.

References Cited

UNITED STATES PATENTS 3,645,923  2/1972  Kan _____ 260—25.5 B F

DONALD E. CZAJA, Primary Examiner

M. J. WELSH, Assistant Examiner

U.S. Cl. X.R.

260—2.5 A E